April 26, 1960 W. SEIGLE 2,933,844
FISHING FLOAT
Filed May 20, 1959 3 Sheets-Sheet 1
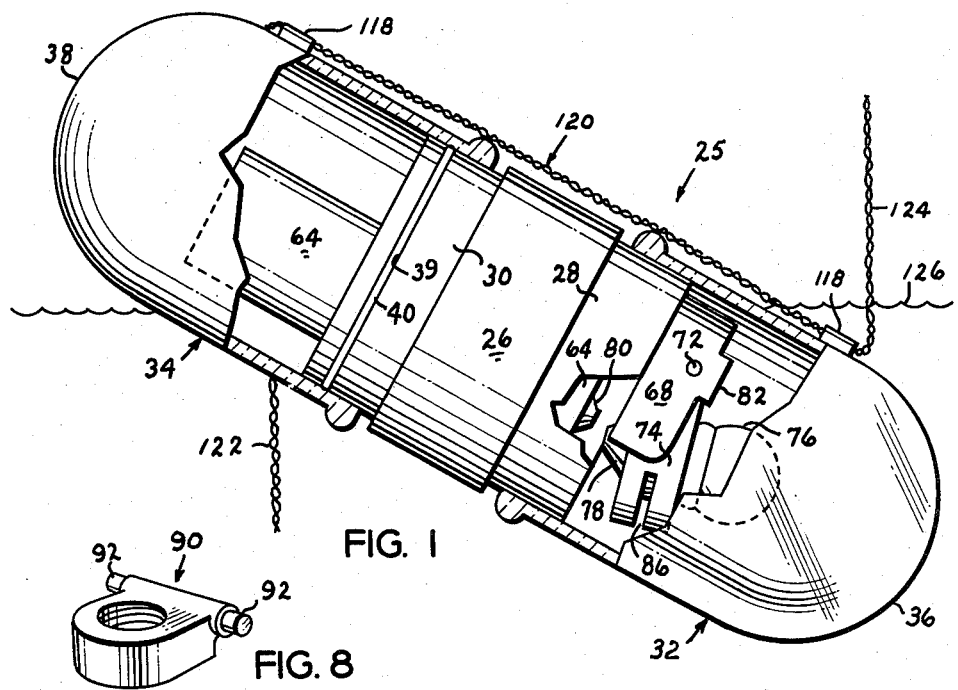
FIG. 1
FIG. 8
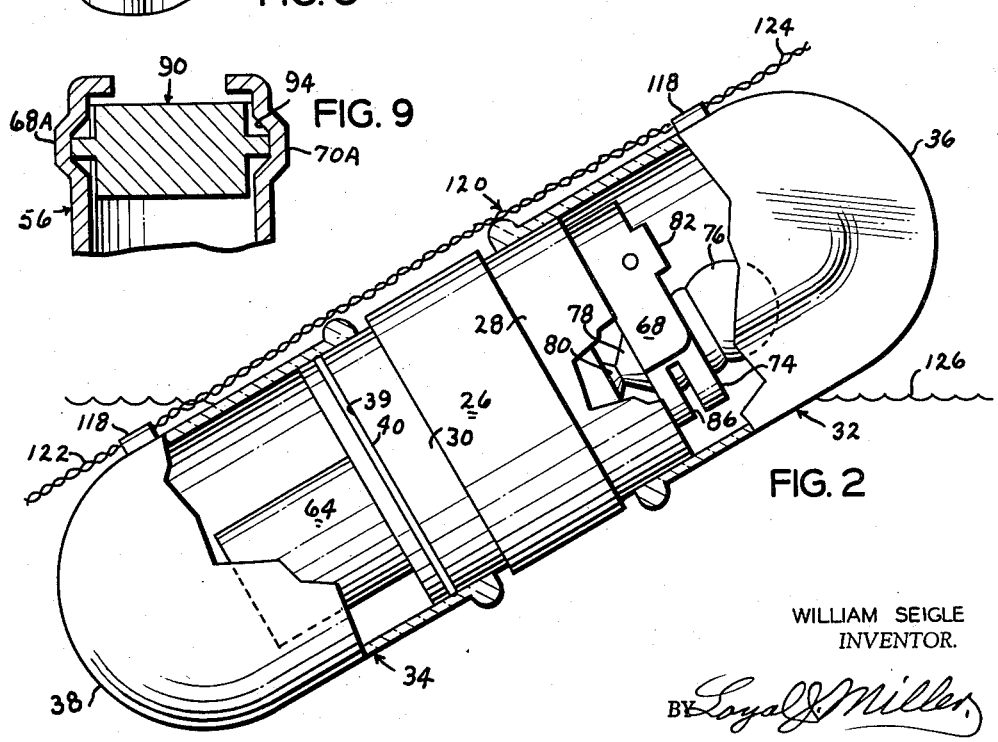
FIG. 9
FIG. 2
WILLIAM SEIGLE
INVENTOR.
BY Loyal J. Miller
ATTORNEY April 26, 1960     W. SEIGLE     2,933,844

FISHING FLOAT

Filed May 20, 1959     3 Sheets-Sheet 2

WILLIAM SEIGLE
INVENTOR.

ATTORNEY

April 26, 1960 W. SEIGLE 2,933,844
FISHING FLOAT
Filed May 20, 1959 3 Sheets-Sheet 3
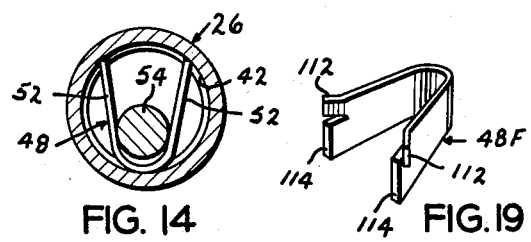
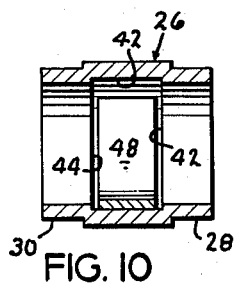
FIG. 10
FIG. 14
FIG. 19
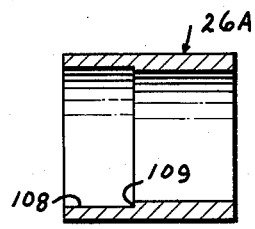
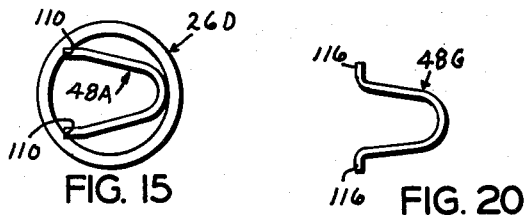
FIG. 11
FIG. 15
FIG. 20
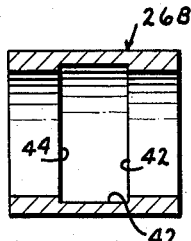
FIG. 12
FIG. 16
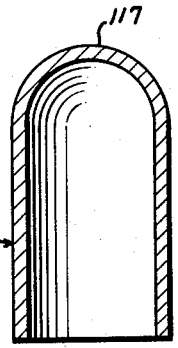
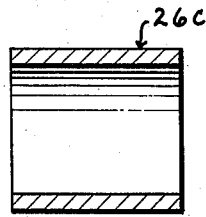
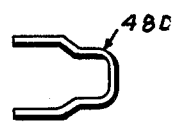
FIG. 13
FIG. 17
FIG. 21
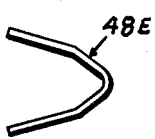
FIG. 18
WILLIAM SEIGLE
INVENTOR.
ATTORNEY United States Patent Office 2,933,844
Patented Apr. 26, 1960

2,933,844
FISHING FLOAT
William Seigle, Dallas, Tex.
Application May 20, 1959, Serial No. 814,609
9 Claims. (Cl. 43—17)

The present invention relates to fishing floats or lures and more particularly to an illuminating fishing float for use while fishing at night.

The instant invention is a continuation-in-part of an application filed by me in the United States Patent Office on July 24, 1958, under Serial Number 750,660, for Fishing Float. This invention is, also, an improvement over the United States patents numbered 2,554,968, and 2,869,274, which were issued to me on March 13, 1951, and January 20, 1959, respectively.

The instant invention provides an improved manner of adjustably supporting the battery and bulb holding device set forth in the above application and patents.

It is, therefore, one of the principal objects of the instant invention to provide an improved means for selectively positioning a battery holder within a fishing float.

An additional important object is to provide a means whereby the mass of the component parts of the device may be readily adjusted longitudinally of the exterior case thereof for altering the center of gravity, thereby altering the floating characteristics of the device relative to the surface of the water.

Another object is to provide a fishing float which will automatically be illuminated by a fish bite or strike on the line to which the device is secured.

A further object is to provide a fishing float or lure which is adaptable to be used on casting lines.

Still another object is to provide a float of this character in which the expendable parts thereof may be readily replaced.

Another object is to provide an electrical circuit means for a device of this class which will be more positive in maintaining operative electrical contact between the movable parts thereof.

An additional object is to provide a bracket and electrical circuit means which may be carried by a buoyant container to form a light emitting fishing lure.

Yet another object is to provide a fishing float of this class which may be adjusted to be illuminated when a fish bites the bait or which may be adjusted so that the light burns continuously, or not at all, as may be desired.

An additional object is to provide a fishing float which is light in weight and which is adaptable to be used on most any type of fishing line.

Still another object is to provide a substantially V-shaped, sleeve-like member for frictionally receiving a battery holder within a fishing float body and wherein the sleeve-like member may be formed in various shapes and wherein the latter may be selectively positioned in the lure body and engaged with the inner-wall thereof.

The present invention accomplishes these and other objects by providing a tubate body and end closure cap means thus forming a float. At least one of the cap means is formed of transparent material. A substantially V-shaped, sleeve-like member frictionally engages the inner-wall of the body by contact between its end portion and the free ends of the legs thereof with the inner-wall of the body. A battery holder or bracket is longitudinally received by the sleeve-like member and extends transversely between the inner-wall of the base portion of the sleeve-like member and an arc of the inner-wall of the body between the ends of the legs of the sleeve-like member. The battery holder frictionally supports a dry cell battery and pivotally mounts a bulb carrier adjacent the terminal end of the battery. A light bulb carried by the bulb carrier swings into and out of circuit, making contact with the battery terminal when the float is tilted longitudinally. Stops forming a part of the battery holder limit the pivoting action of the bulb carrier. A resilient wire clip carried by the battery holder frictionally engages the bulb carrier and acts as a stabilizing means to maintain the bulb in contact with the battery terminal against small amplitudes of movement of the bulb carrier. The end closure means of the float are provided with line connecting loops, or eyes, for connecting to a fishing line.

Other objects will be apparent from the following description when taken in conjunction with the accompanying three sheets of drawings, wherein:

Figure 1 is an elevational side view of the device, partly in section, illustrating the position the device assumes when fishing;

Figure 2 is a view similar to Fig. 1, illustrating the approximate position of the device tilted to illuminating position by a strike;

Figure 8 is a perspective view of a bulb carrier, per se;

Figure 9 is a vertical cross-sectional view, illustrating the manner of mounting the bulb carrier on the battery holder;

Figure 10 is a cross-sectional view taken substantially along the longitudinal axis of the body and illustrating the position of the sleeve-like member therein;

Figures 11, 12 and 13, are cross-sectional views similar to Fig. 10 illustrating various modifications of the tubate body;

Figure 14 is a transverse cross-sectional view through the body, illustrating the manner of adjusting the sleeve-live member for engagement with the inner-walls of the body;

Figure 15 is an end elevational view of the body and illustrating another manner of securing the sleeve-like member therein;

Figures 16, 17 and 18, are end elevational views, illustrating alternate shapes of the sleeve-like member;

Figure 19 is a perspective view of the sleeve-like member having partially flanged ends;

Figure 20 is an end view of the sleeve-like member, wherein the leg ends are both flanged outwardly; and, Figure 21 is a sectional view taken along the longitudinal axis of an alternate form of the float body.

Like characters of reference designate like parts in those figures of the drawings in which they occur.

In the drawings:

Figure 3:
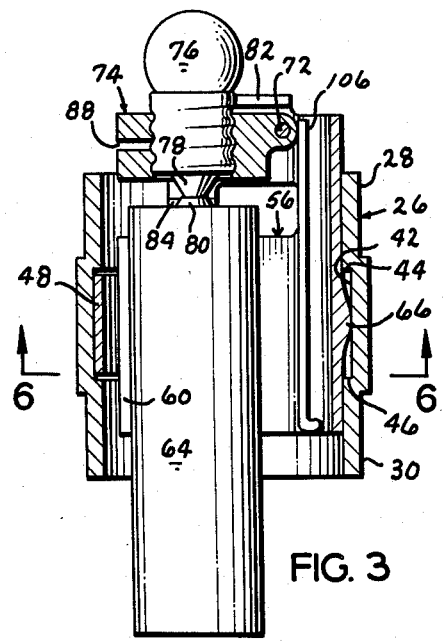
Figure 3 is a vertical section view of the device, partly in elevation, with the end closure means removed, the section being taken along the longitudinal axis of the device.
Figure 6:
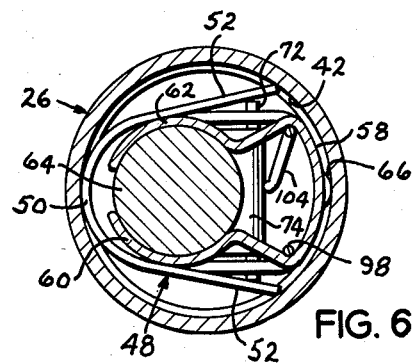
Figure 6 is a horizontal sectional view taken substantially along line 6—6 of Fig. 3.
Figure 5:
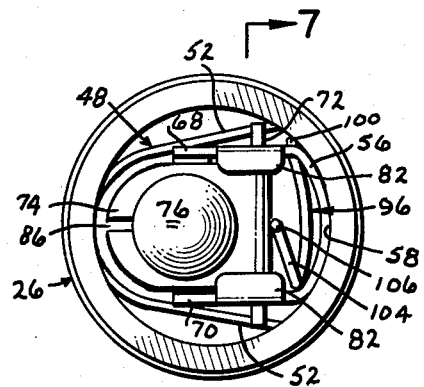
Figure 5 is an end view of the device with the adjacent end closure cap removed.

The reference numeral 25 indicates, as a whole, the device which is elongated and cylindrical-like in general configuration. The device 25 includes a central tubate body 26 having circumferentially reduced end portions 28 and 30 adapted for receiving tubular caps or closure means 32 and 34, respectively. The caps 32 and 34 have semi-spherical closed ends 36 and 38, respectively, thus forming with the body 26, a water tight float. As a means for insuring that the fit between the caps and the reduced end portions of the body be water tight, the reduced end portions 28 and 30 may be each provided with an annular groove for receiving suitable packing material such as an "O-ring." One such groove 39 and ring 40 is shown on the body end portion 30. At least one of the cap means, preferably the cap 32 is formed of transparent or translucent material for the purposes which will be readily apparent.

The body 26 is preferably formed of some suitable light weight material and diametrically is a size which will readily receive the component parts more fully described hereinbelow and when assembled with caps 32 and 34 will displace a quantity of water exceeding the mass of the device. In the examples illustrated by Figs. 3, 5, 6 and 10, the bore of the body is circumferentially enlarged intermediate its ends to form a groove or recess 42. The length of the recess 42 with respect to the length of the body 26 may be relatively short, as shown, or it may be extended and terminate just inwardly of the respective ends of the body as may be desired. The respective ends of the recess are preferably defined by annular shoulders 44 and 46, respectively.

A substantially V-shaped sleeve-like member 48, having a wall thickness substantially equal with respect to the depth of the recess 42 and having a length substantially equal with respect to the longitudinal spacing between the shoulders 44 and 46, is co-operatingly received within the recess 42. Thus the outer surface of the base portion 50 of the sleeve-like member is in frictional engagement with the inner-wall of the body forming the recess while the free end edges of the diverging legs 52 contact a longitudinal portion of the body inner-wall and subtend an arc of the inner-wall of the body. The frictional fit between the sleeve-like member 48 and the inner-wall forming the recess 42 may be varied from a manually movable sliding contact position wherein the member 48 may be rotated relative to the body 26 or firmly positioned within the body. Such adjustment of the member 48 is effected by placing the member within the bore of the recess and then longitudinally inserting a rod or tool, circular in cross section, as at 54 (Fig. 14), through the member 48 and manually forcing the tool 54 against the inner surfaces of the base portion of the V-shaped member 48. This tends to urge the diverging legs 52 further apart and results in impinging the member 48 against the inner-wall of the body. Removal of the member 48 from the body 26 is accomplished by forcing the leg portions 52 toward each other, as by the use of long-nosed pliers, not shown, thus freeing the member 48 from contact with the inner-wall of the body 26.

An elongated bracket or battery holder 56 has one longitudinal side 58 thereof arcuately formed on a radius complemental with respect to the radius of the bore of the body 26 and further includes a pair of arcuately curved cooperating friction arms 60 and 62 which extend laterally of the side 58. The transverse distance across the battery holder from the arcuate side 58 to the free longitudinal edges of the arms 60 and 62 is substantially less than the diameter of the bore of the body 26 so that the bracket may be frictionally slid longitudinally into the body 26 within the confines of the sleeve-like member 48 therein. As may be seen from an examination of Fig. 6 the battery holder arms 60 and 62 extend from the arcuate side 58 inwardly toward the longitudinal axis of the body 26 and are then arcuately formed complementally in a circular manner for frictionally receiving a small dry cell battery 64. Similarly, it may be seen that the free longitudinal edges of the battery holder arms 60 and 62 are disposed in spaced-apart relation so that they may be adjusted to decrease or increase the spacing therebetween to insure a frictional and circuit making contact between the arms and the battery 64. The arcuate longitudinal free edge portions of the battery holder arms 60 and 62 are frictionally received by the inner surfaces of the wall forming the base portion of the sleeve-like member 48 while the arcuate side 58 of the battery holder frictionally contacts an arc of the inner-wall of the body 26 between the positions of the free end edges of the sleeve-like member 48. Intermediate its ends the battery holder arcuate side 58 is provided with a laterally outward projecting lug 66 which extends outwardly of the side 58 a distance substantially equal to the depth of the recess 42 thus maintaining contact between the battery holder and the inner-wall forming the recess 42. Thus, the resilience of the sleeve-like member 48 maintains the battery holder 56 at selected longitudinal positions within the body 26. The overall length of the battery holder 56 is substantially equal to the length of the body 26 and longitudinally the battery holder arms 60 and 62 are substantially equal with respect to the length of the member 48.

Figure 4:
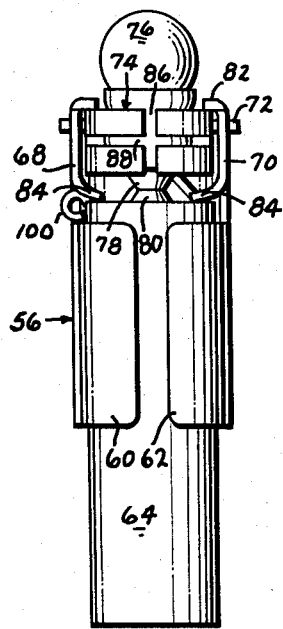
Figure 4 is an elevational view of the battery holder and electrical means carried thereby.
Figure 7:
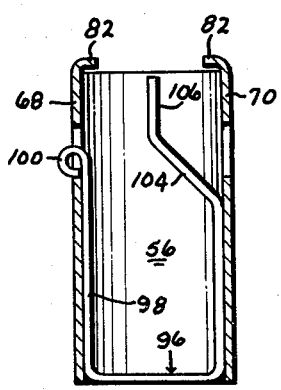
Figure 7 is a vertical sectional view taken substantially along line 7—7 of Fig. 5, illustrating the position of the resilient wire clip within the battery holder.

The upper end portion of the battery holder 56, as seen in Figs. 3, 4 and 7, is provided with a pair of parallel side members 68 and 70 which extend laterally of the arcuate side 58 in spaced-apart relation above the arms 60 and 62. A pivot pin 72 bridges the space between the side members 68 and 70 adjacent the upper end of the battery holder, as viewed in Figs. 3 and 4.

A bulb carrier or socket 74 is pivotally mounted by the pin 72. The socket 74 is preferably formed of relatively soft metallic material, such as lead, and is centrally bored co-axial with respect to the axis of the circular formed arms 60 and 62. The bore of the socket is provided with roll type threads for receiving a conventional relatively small lamp or bulb 76, such as a flashlight bulb. The base end 78 of the bulb is disposed inwardly of the co-operating inwardly disposed terminal end 80 of the battery 64. Thus, it may be seen that the socket 74 is free to gravitationally swing or pivot toward and away from the terminal 80 of the battery for making and breaking an electrical circuit between the battery and the bulb which is completed by surface contact between the battery 64 and the battery holder 56.

Movement of the socket 74 away from the battery 64 is limited by a pair of stops 82 which co-operatingly project inwardly from the outwardly disposed end surfaces of the members 68 and 70 adjacent the opposing ends of the pivot pin 72 and above the upper surface of the socket 64, as viewed in Figs. 3 and 4. Similarly movement of the socket toward the battery is limited by inwardly projecting stops or prongs 84 (Figs. 3 and 4) which contacts the inwardly disposed surfaces of the socket 74 and limits movement of the battery 64 toward the socket. Thus, the socket 74 is free to pivot through only a relatively short distance as the position of the body 26 changes and this is preferably so in order that sudden changes of the position of the device will not result in the socket moving through an angle of travel which would result in sharp blows or a hammering action of the bulb base end 78 against the battery terminal 80 which would materially damage the bulb.

The free end portion of the socket 74 is provided with a vertical and a horizontal slot 86 and 88, respectively, as seen in Fig. 4, which extends inwardly and communicates with the threaded bore of the socket. The purpose of the horizontal slot 88 is to permit a slight compression between the respective opposing surfaces of this free end portion of the socket for effecting a shortening of the thread pitch of the socket and impinging the bulb 76 therein thus preventing accidental loosening of the same while in use. Similarly the vertical slot 86 permits some adjustment of the diametrical size of the threaded bore of the socket to compensate for variations in bulb thread sizes.

An alternate arrangement of the socket is illustrated in Figs. 8 and 9 and is indicated by the numeral 90. This socket 90 omits the slots 86 and 88 of the socket 74 and is further characterized by the manner of its pivotal mounting between the members 68 and 70. Two relatively short pivot pins 92 are secured to opposing sides of the socket 90 in axial alignment. These pivot pins 92 may be inserted into co-operating perforations within the members 68 and 70 as is the pin 72. This arrangement insures a positive electrical contact between the bulb 76, socket 90 and the pins 92. To further insure stabilization of the socket 90 and better electrical contact between these pins 92 and the battery holder members 68 and 70 the latter, indicated at 68A and 70A, may be formed with co-operating inwardly open recesses or indentations 94 (Fig. 9) which co-operate in frictionally receiving the ends of the pins 92.

When the device is disposed in the position shown by Figs. 1 and 2 the mass of the socket 74 insures good electrical contact between the bulb and battery terminal 80, but when the device is disposed substantially horizontally, or at an angle approaching a horizontal position, the pin 72 supports most of the weight of the socket which results in poor or intermittent contact between the bulb and the battery terminal. This action results in a flashing "on and off" of the light emitted from the bulb. To overcome this flashing of the light bulb 76 a stabilizing means in the form of a spring wire clip 96 may be used.

The stabilizing means or clip 96 is carried by the battery holder 56 inwardly of the arcuate side 58. The clip 96 is substantially U-shaped in general configuration and is adapted to be frictionally forced into the end of the battery holder 56 opposite the socket end with one leg portion 98 contacting the lower end portion of the holder, as viewed in Fig. 7, and extended upwardly therealong and terminating in an arcuately formed end 100 disposed between the upper edge surface of the arm 60 and the lower edge surface of the member 68, as seen in Figs. 4 and 7, for preventing longitudinal movement of the clip relative to the battery holder 56. The other leg 102 of the clip is extended upwardly along the opposite inward edge of the arcuate edge portion 58 a selected distance and is bent inwardly and upwardly, as at 104, and terminates in a vertically disposed end portion 106 which is arranged to bear against that adjacent portion of the socket through which the pin 72 is passed. Thus, the clip 96, resiliently retained by the holder 56 and similarly bearing firmly against the socket 74, offers no appreciable amount of restraint to gravitational attraction on the socket 74, in pivoting on or with the pin 72, but tends to prevent small amplitudes of movement thereof and maintains the bulb in firm contact with the battery terminal, once such contact is made. Since the leverage of the clip end 106 on the socket 74 is small when compared to the leverage of the mass of the socket 74 in pivoting about the axis of the pin 72, gravitational attraction easily overcomes the resilient restraint of the clip when the device is definitely tilted.

Referring more particularly to Figs. 11, 12, 13 and 15, the numerals 26A, 26B, 26C and 26D, respectively, indicate alternate ways of forming the body 26. In these examples, the exterior end portions of the body are not circumferentially reduced for receiving the cap means 32 and 34. One end of the body 26A is counterbored, as at 108, forming an annular shoulder 109, intermediate the ends of the body, against which the sleeve-like member 48 is positioned. The body 26C, illustrated by Fig. 13, shows a smooth bore throughout the length of the body which permits longitudinal movement of the member 48 throughout the length of the body; thus, for example, the body 26C may be formed of plastic or similar material, rather than metal, wherein the ends of the legs of the member 48 may be frictionally engaged by the body bore as disclosed hereinabove. The body 26D, illustrated in Fig. 15, is similar to the body 26C but is provided with a pair of longitudinal grooves 110 extending along the inner-wall of the body bore in spaced-apart relation for receiving the free ends of the legs of the sleeve-like member 48A.

Alternate ways of forming the sleeve-like member 48 are illustrated by Figs. 15, 16, 17, 18, 19 and 20, and numbered 48A, 48C, 48D, 48E, 48F and 48G, respectively. Each of these sleeve-like members 48A through 48G perform the same function with respect to the member 48 but are formed in these alternate configurations for the purpose of better frictional contact between these members and the bore of the body; for example, the member 48F has a portion of the free ends of the legs thereof split to provide outwardly turned flanges 112 which co-act with the remaining end portions of the legs 114 to provide a gripping effect on the inner surface of the body wall. Similarly the outwardly flanged ends 116 of the member 48G grips the inner-wall of the body.

Fig. 21 illustrates still another manner of forming the body portion, which is indicated by the numeral 26E. The body 26E is formed with smooth outer and inner-walls substantially like the body member 26C but has one end of the body closed by a semi-spherical end 117. This body, 26E, receives the selected one of the sleeve-like members, battery holder 56, bulb 76 and battery 64 and requires only one of the cap means 32 or 34 to complete the float.

Operation

In operation the device is assembled substantially as disclosed hereinabove. The caps 32 and 34 are each exteriorly provided with line engaging loops or eyes 118 through which a fishing line 120 may be passed, or to which the line may be secured. As viewed in Fig. 1, the left hand vertical portion of the line 122 leads to the fish-hook and bait, not shown, while the right hand vertical portion 124 of the line 120 is connected with the fishing pole or reel, not shown. The mass of the battery holder 64 and socket 74 is longitudinally adjusted within the body 26 so that the device 25 floats in the water in substantially the position shown in Fig. 1, the upper surface of the water being indicated by the wavy line 126. Thus, as shown in Fig. 1, gravitational attraction for the socket 74 has moved the same so that the bulb 76 is out of contact with the battery terminal, the movement of the socket in this direction being limited by the lugs 82. When a fish strikes or takes the bait, the line portion 122 is pulled downwardly thus tilting or disposing the device 25 in substantially the position shown in Fig. 2. In this position gravitational attraction has swung the socket 74 so that the bulb 76 makes electrical contact with the battery terminal end 80, thus exciting the bulb filament which is readily visible through the cap 32.

The device 25 may be readily used as a fishing float or lure without the use of the illuminating qualities, as for example in day time fishing, by manually moving the battery longitudinally of the arms 60 and 62 away from contact position with the bulb 76 or by removing the battery from the device. Similarly the device may be used as a constantly illuminated night fishing float or lure by manually moving the battery so that the terminal end 80 thereof is in continuous contact with the base 78 of the lamp 76.

When adjusting the battery holder 56 relative to the body 26 the lug 66 frictionally contacts the respective shoulder 44 or 46 and serves as a warning that further movement of the bracket relative to the body will disassemble the device.

When using one of the alternate bodies 26C, 26D, or 26E, the lug 66 obviously does not have a limiting shoulder to contact and permits positioning the battery holder 56 throughout the length of the body. The battery holder may be formed without the lug 66 when using bodies having a smooth bore which permits the battery holder side 58 to contiguously contact the inner-wall of the body. The battery holder 56 may be manually rotated relative to the body for positioning the mass of the device in the desired manner for floating with the loops 118 upwardly and when the holder is thus rotated the sleeve is rotated with the bracket. The sleeve and battery holder are so related for a co-operative snug fit within the body bore so that the bracket arms 60 and 62 will contact the inner surface of the sleeve-like member at all times thus holding the battery holder in a predetermined position.

It seems readily obvious that various floating angles of the device relative to the surface of the water may be obtained by simply moving the battery holder 56 longitudinally of the body 26 to change the center of gravity of the device.

The split socket 74 permits the use therewith of bayonet base type bulbs, not shown. This is accomplished by simply inserting the base end portion of the bulb into the bore of the socket and closing the socket around the bulb base by applying pressure to the socket on opposing sides of the vertical slot 86. Obviously the socket bore may be similarly enlarged to receive bayonet base type bulbs by spreading the sides of the socket and enlarging the width of the slot 86. Such enlarging or reduction of the size of the socket bore must be only of such extent that it will not cause or result in damaging the socket beyond the yield point of the material.

When the socket 90 is employed in place of the split socket 74, and is mounted as is illustrated in Fig. 9, use of the stabilizing clip 96 is not essential, since frictional contact between pins 92 and the bracket sides 68A and 70A tend to steady the socket 90. The clip 96 may similarly be omitted from the device when using the split socket 74, if desired.

The battery 64 and bulb 76 may be easily replaced by simply removing the respective cap 32 or 34.

It seems obvious that the battery holder 56, socket 74 and associated bulb and battery may be inserted into any suitable container for forming an illuminated fishing plug or lure, if desired.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An illuminating fishing float, comprising: a tubate body; tubular cap means having a bore adapted to be closely received by the respective ends of said body to effect a water tight seal, each of said cap means having a semi-spherical closed end; a substantially V-shaped sleeve of resilient material frictionally carried by the inner-wall of said body; a battery holder longitudinally disposed between the legs of said V-shaped sleeve and extending transversely between the base portion of said sleeve and the inner-wall of said body between the free ends of the legs of the sleeve; a battery frictionally carried by said battery holder; a bulb carrier pivotally mounted on said battery holder adjacent the terminal end of said battery; stops integrally carried by said one end of said battery holder and engageable with opposing surfaces of said bulb carrier for limiting the pivoting movement of the latter; a light bulb supported by said bulb carrier in a manner to gravitationally swing into and out of circuit making contact with the terminal of said battery when the float is tilted longitudinally; and bulb carrier stabilizing means carried by the battery holder for frictional engagement with said bulb carrier and stabilizing the latter when the bulb is in circuit making contact with the battery terminal.

2. An illuminating fishing float, comprising: a tubate body; tubular cap means having a bore adapted to be closely received by the respective ends of said body for forming a water tight seal, each of said cap means having a semi-spherical closed end; a split sleeve-like member having opposing diverging walls substantially forming a V-shape, said sleeve-like member having its base end portion and the free ends of its legs frictionally contacting the inner-wall of said body; a battery holder longitudinally disposed between the legs of said sleeve-like member and extending transversely between the base portion of said sleeve-like member and the inner-wall portion of said body between the free ends of the legs of said sleeve-like member; a battery frictionally carried by said battery holder; a bulb carrier pivotally mounted on said battery holder adjacent the terminal end of said battery; stops integrally carried by said one end of said battery holder and engageable with opposing surfaces of said bulb carrier for limiting the pivoting movement of the latter; a light bulb supported by said bulb carrier in a manner to gravitationally swing into and out of circuit making contact with the terminal of said battery when the float is tilted longitudinally; and bulb stabilizer means carried by the battery holder for frictional engagement with said bulb carrier and stabilizing the latter when the bulb is in circuit making contact with the battery terminal.

3. An illuminating fishing float, comprising: a tubate body; tubular cap means having a bore adapted to be closely received by the respective ends of said body for forming a water tight seal, each of said cap means having a semi-spherical closed end; a substantially V-shaped sleeve-like member having a relatively thin wall frictionally carried by the inner-wall of said body by contact between the inner-wall of the body with the base end portion and the free end edges of said sleeve-like member; a battery holder longitudinally received by said sleeve-like member and extending transversely between and frictionally engaged with the inner surface of the base end portion of said sleeve-like member and an arc of the inner-wall portion of said body subtended by the leg ends of said sleeve-like member; a battery frictionally carried by said battery holder; a bulb carrier pivotally mounted on said battery holder adjacent the terminal end of said battery; stops integrally carried by said one end of said battery holder and engageable with opposing surfaces of said bulb carrier for limiting the pivoting movement of the latter; a light bulb supported by said bulb carrier in a manner to gravitationally swing into and out of circuit making contact with the terminal of said battery when the float is tilted longitudinally; and bulb carrier stabilizer means carried by the battery holder for frictional engagement with said bulb carrier and stabilizing the latter when the bulb is in circuit making contact with the battery terminal.

4. Structure as specified in claim 3 in which said tubate body has an annular recess formed in its inner-wall forming a shoulder adjacent each end of the body for receiving said sleeve-like member between said shoulders to permit rotative movement of said sleeve-like member relative to said body and prevent longitudinal movement of said sleeve-like member within said body.

5. Structure as specified in claim 4 in which the free ends of the legs of said sleeve-like member are turned arcuately outward to form flanged ends for contacting the inner-wall of said body and preventing rotation of said sleeve-like member relative to said body.

6. Structure as specified in claim 3 in which a portion of the free end of at least one leg of the sleeve-like member is angularly bent outward for gripping engagement with the inner-wall of said body and preventing rotative movement of said sleeve-like member relative to said body.

7. Structure as specified in claim 3 in which said tubate body is counter-bored from one end to form a bore of enlarged diameter defined by an annular shoulder intermediate the ends of said body for restricting longitudinal movement of said sleeve-like member relative to said body.

8. An illuminating fishing float, comprising: a tubate body having a pair of spaced-apart longitudinally extending grooves formed in its inner-wall; tubular cap means having a bore adapted to be closely received by the respective ends of said body for forming a water tight seal, each of said cap means having a semi-spherical closed end, at least one of said cap means being capable of transmitting light rays; a substantially V-shaped sleeve-like member having a relatively thin wall frictionally carried by the inner-wall of said body with the free end edges of the legs of said V-shaped member disposed within the longitudinal grooves in the inner-wall of said body; a battery holder longitudinally received by said sleeve-like member and extending transversely between and frictionally engaged with the inner surface of the base end portion of said sleeve-like member and an arc of the inner-wall portion of said body between the longitudinal grooves formed in the battery; a battery frictionally carried by said battery holder; a bulb carrier pivotally mounted on said battery holder adjacent the terminal end of said battery; stops integrally carried by said one end of said battery holder and engageable with opposing surfaces of said bulb carrier for limiting the pivoting movement of the latter; a light bulb supported by said bulb carrier in a manner to gravitationally swing into and out of circuit making contact with the terminal end of said battery when the float is tilted longitudinally; and bulb carrier stabilizing means carried by said battery holder for frictional engagement with said bulb carrier and stabilizing the latter when the bulb is in circuit making contact with the battery terminal.

9. An illuminating fishing float, comprising: a tubate body having one semi-spherical closed end; tubular cap means having a bore adapted to be closely received by the open end of said body for forming a water tight seal, said cap means being capable of transmitting light rays; a substantially V-shaped sleeve-like member having a relatively thin wall frictionally carried by the inner-walls of said body; a battery holder longitudinally received by said sleeve-like member and extending transversely between and frictionally engaged with the inner surface of the base end portion of said sleeve-like member and an arc of the inner-wall portion of said body between the free ends of the legs of said sleeve-like member; a battery frictionally carried by said battery holder; a bulb carrier pivotally mounted on said battery holder adjacent the terminal end of said battery; stops integrally carried by said one end of said battery holder and engageable with opposing surfaces of said bulb carrier for limiting the pivoting movement of the latter; a light bulb supported by said bulb carrier in a manner to gravitationally swing into and out of circuit making contact with the terminal end of said battery when the float is tilted longitudinally; and bulb carrier stabilizing means carried by said battery holder for frictional engagement with said bulb carrier and stabilizing the latter when the bulb is in circuit making contact with the battery terminal.

No references cited.